United States Patent
Bhatti et al.

(10) Patent No.: US 8,218,661 B2
(45) Date of Patent: *Jul. 10, 2012

(54) OFDMA BASED MEDIUM ACCESS CONTROL AND FRAME STRUCTURE DESIGN FOR INDUSTRIAL APPLICATIONS

(75) Inventors: Ghulam Bhatti, Mansfield, MA (US); Zafer Sahinoglu, Arlington, MA (US); Yi Huang, Riverside, CA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 846 days.

This patent is subject to a terminal disclaimer.

(21) Appl. No.: 12/347,087

(22) Filed: Dec. 31, 2008

(65) Prior Publication Data
US 2009/0238293 A1 Sep. 24, 2009

Related U.S. Application Data

(60) Provisional application No. 61/037,395, filed on Mar. 18, 2008.

(51) Int. Cl.
*H04L 27/28* (2006.01)
(52) U.S. Cl. .................................................. 375/260
(58) Field of Classification Search .................. 375/260; 455/59; 370/321, 337, 347, 442
See application file for complete search history.

(56) References Cited

U.S. PATENT DOCUMENTS

| 7,751,824 B2 | 7/2010 | Nonin et al. | |
| 7,957,329 B2* | 6/2011 | Ahn et al. | 370/280 |
| 2005/0207370 A1* | 9/2005 | Harada | 370/321 |
| 2008/0260000 A1* | 10/2008 | Periyalwar et al. | 375/133 |
| 2010/0232335 A1* | 9/2010 | Lee et al. | 370/312 |

FOREIGN PATENT DOCUMENTS

WO 2007/148933 12/2007

* cited by examiner

*Primary Examiner* — Sam K Ahn
(74) *Attorney, Agent, or Firm* — Dirk Brinkman; Gene Vinokur

(57) ABSTRACT

A network includes a master and a set of slaves that communicate orthogonal frequency-division multiplexing (OFDM) and time division multiple access (TDMA) symbols on sub-carriers. A master broadcasts to the set of slaves using downlinks and all of the sub-carriers, a broadcast polling packet including data packets for each slave and sub-carrier assignments for the slaves. Each slave, in response to receiving the downlink polling packet, transmits simultaneously a response packet to the master using uplinks and the assigned sub-carriers. The master then transmits to the set of slave using the downlinks and all of the sub-carriers, a group acknowledgement packet, wherein the broadcast polling packet, the response packet, and the group acknowledgement packet comprise one superframe in one communication cycle, and wherein the broadcasting on the downlinks and the transmitting on the uplinks are disjoint in time.

13 Claims, 5 Drawing Sheets

200

OFDMA BASED MEDIUM ACCESS CONTROL AND FRAME STRUCTURE DESIGN FOR INDUSTRIAL APPLICATIONS

RELATED APPLICATION

This Non-Provisional Application claims priority to U.S. Provisional Application 61/037,395, "Hybrid Multiple Access Method and System in Wireless Networks with Extended Content Free Access Period." filed by Sahinoglu et al., on Mar. 18, 2008, and incorporated herein by reference.

FIELD OF THE INVENTION

This invention is related in general to wireless networks, and in particular to a wireless network with a master node that controls multiple slaves.

BACKGROUND OF THE INVENTION

Orthogonal frequency-division multiplexing OFDM employs discrete multi-tone modulation. With OFDM, the tones are modulated on a large number of evenly spaced subcarriers using some m-ary of quadrature amplitude modulation (QAM) or phase shift keying, for example. OFDM allows only one user (transceiver station) on a channel at any given time to accommodate multiple users, an OFDM system must use time division multiple access (TDMA) or frequency division multiple access (FDMA).

Orthogonal frequency-division multiplexing access (OFDMA) is a multi-user version of OFDM that allows multiple users to concurrently access the same channel, where a channel includes a group of evenly spaced subcarriers. OFDMA distributes subcarriers among users (transceivers) so multiple users can transmit and receive within the same single RF channel (TDD) or different RF channel (FDD) on multiple subchannels. The subchannels are further partitioned into groups of narrowband "tones." Typically, the number of tone in a subchannel is dependent on the total bandwidth of the subchannel.

A conventional star network includes of one master node and multiple slave nodes. The master communicates with all of the slaves node, and the slave nodes only communicate with the master nodes. Such networks can use orthogonal frequency division multiple access (OFDMA), and time division multiple access (TDMA) symbols.

In applications that require high reliability with relatively low latency such as factory automation, data from all the slaves need to be retrieved within a given latency constraint (delay). The latency constraint is equal to a communication cycle.

Polling of slaves one-by-one may not satisfy the latency requirement of the applications.

Also, in case when transmission from a slave node fails, that particular slave should be given a retransmission opportunity to meat the required transmission reliability without violating the latency constraint.

SUMMARY OF THE INVENTION

Therefore, according to embodiments of the invention, transmissions on a downlink (from a master nodes to slave nodes) and an uplink (from the slave nodes to the master node) are separated via time division multiple access (TDMA).

Slave nodes transmit simultaneously without causing collisions due to orthogonality of the slave node transmissions.

The current invention also describes an adaptive retransmission strategy for both uplink and downlink transmissions to increase communication reliability under a given latency constraint.

BRIEF DESCRIPTION OF THE DRAWINGS

FIG. 6 is a block diagram of a slave uplink retransmission packets according to the invention.

DETAILED DESCRIPTION OF THE PREFERRED EMBODIMENTS

Figure 1:
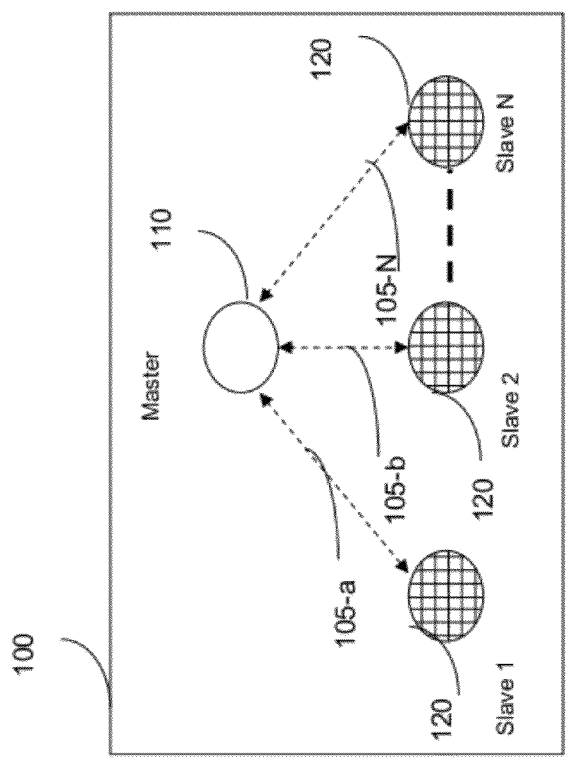
FIG. 1 is a schematic of a star network 100 including one master node and N number of slave nodes according to embodiments of the invention.

As shown in FIG. 1, a communication network 100 according to embodiments of the invention includes a master node (master) 110 and a set of N slave nodes (slaves) 120. The master 110 is the coordinator of all communications on wireless links (channels) 105, and each slave has an identity (ID). The links 105*a*-105N between the master and the slaves 120 are symmetrical. In other words, if the master 120 can transmit successfully to a slave 120, then slave 120 can also transmit successfully to the master 110. Therefore, each node includes a wireless transceiver (transmitter and receiver).

In one embodiment, the slaves include sensor in an industrial application, e.g., a manufacturing or chemical plant.

A method for communicating between the master and the slaves ensures that in each communication cycle, the master 110 obtains a copy of sensor data from all operational slaves 120.

Embodiments of the Invention Make the Following Assumptions:

All the slaves can transmit simultaneously, because they use orthogonal frequency resources. The resources the slaves use comprise one of the following:

a. different frequency sub-carriers,
  b. different direct sequence spread spectrum codes (DSSS), or
  c. both of (a) and (b).

The master assigns each slave the communication resources the slave uses, including the number of sub-carriers, which sub-carriers to use and/or which DSSS code to use.

The transmissions from the slaves to the master are uplink rransmissions

The transmissions from the master to the slaves are downlink transmissions, which use all available communication resources, i.e., sub-carriers.

Downlink and uplink transmissions are separated via time-division multiple access. In other words, uplink and downlink transmissions are disjoint in the time domain.

Figure 2:
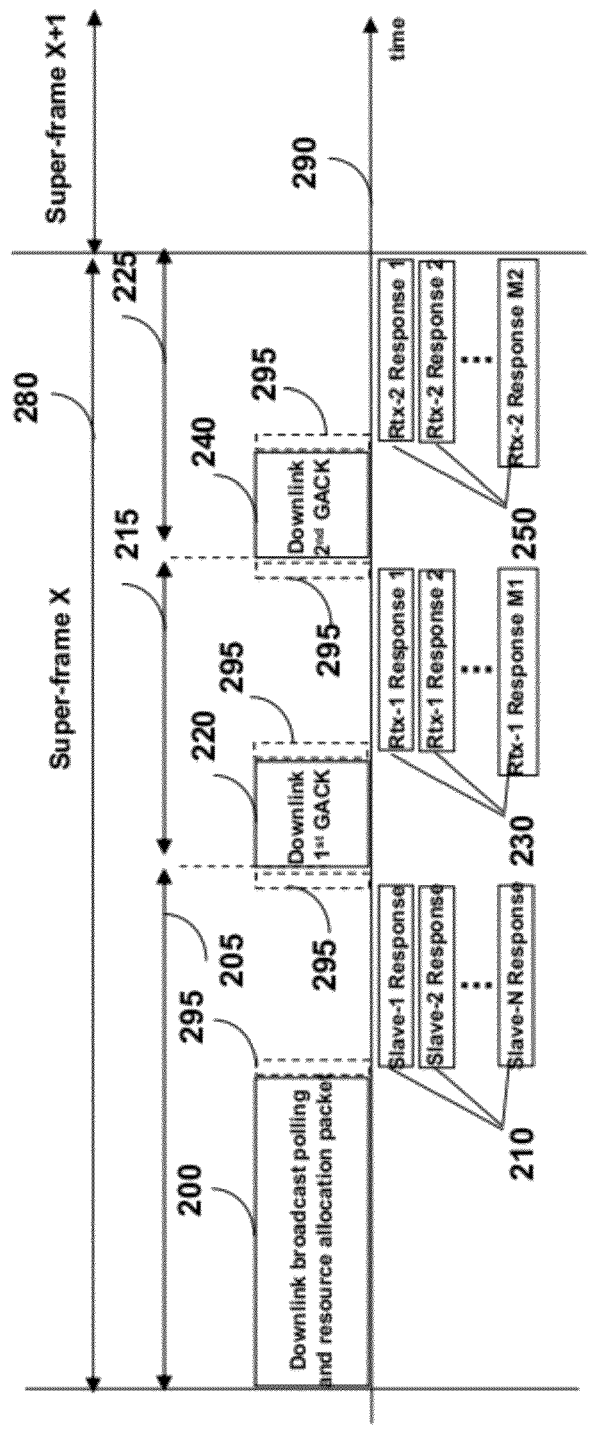
FIG. 2 is a block diagram of time division scheduling of downlink transmissions according to one embodiment of the invention.

According to one embodiment of the invention, FIG. 2 shows—scheduling of downlink and uplink transmissions in the time domain 290 within one communication cycle that is called super-frame 280. The super-frame 280 in each cycle includes a maximum of three uplink transmissions and three downlink transmissions.

The downlink transmissions include a broadcast polling packet 200, a group acknowledgment packet (GACK-1) packet 220, and a GACK-2 packet 240. The uplink transmissions include slave responses 210, $1^{st}$ slave response retransmission (Retx-1) packets 230, and $2^{nd}$ slave response retransmission (Retx-2) packets 250. The order of these six transmissions is: Broadcast polling packet 200, slave responses 210, GACK-1 packet 220, Retx-1 packets 230, GACK-2 packet 240, and Retx-2 packets 250, as shown in FIG. 2. Between two consecutive transmissions, there is a fixed time-interval called the turn around time 295, which enables the transceivers to switch between transmit mode and receive modes.

The super frame 280 starts with broadcasting of the downlink broadcast polling and resource allocation packet 200 by the master 110. This packet 200 is transmitted using communication resources, such that all the slaves can decode the packet successfully in an ideal channel case. For instance, in the case of a multi-carrier communication system, the broadcast polling packet 200 can use all the sub-carriers. Using all the resources for the downlink transmission increases the probability for its reliable reception by the slaves.

Figure 3:
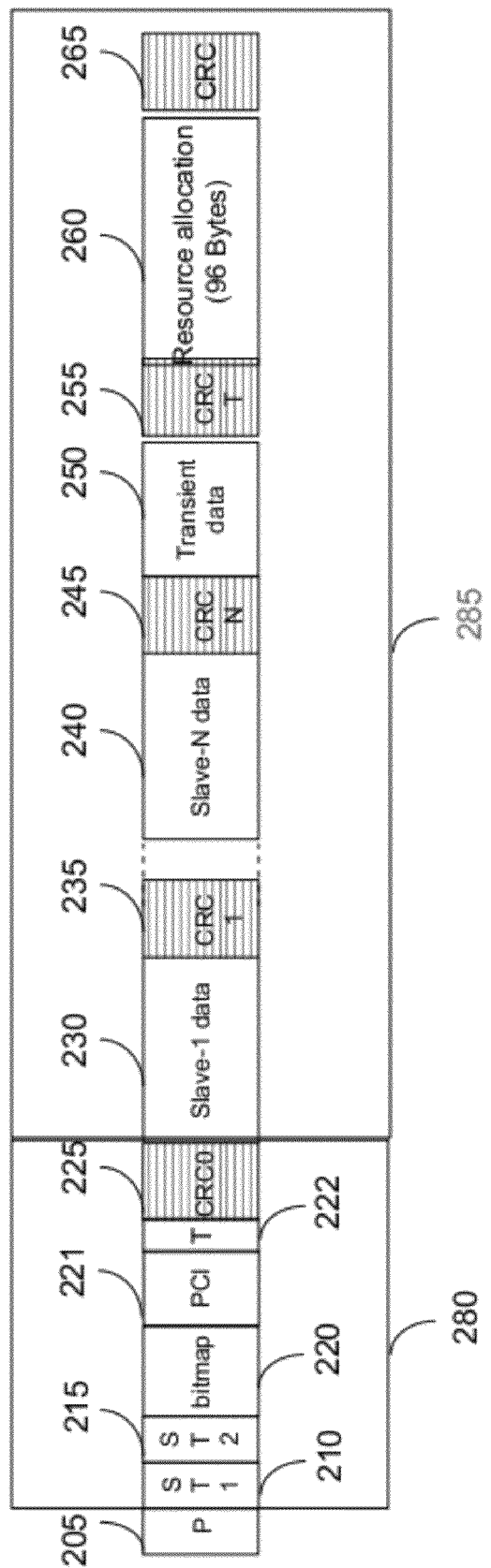
FIG. 3 is a block diagram of a broadcast polling downlink transmission packet according to embodiments of the invention.

As shown in FIG. 3, the broadcast packet comprises a preamble 205, the physical layer control header 280 and a payload 285.

Preamble P 205. Each preamble is composed of three OFDM symbols, and occupies a fixed time interval equal to 35.7 μs. The preamble is used for signal detection, frequency-offset cancellation, time synchronization, and channel estimation.

Physical layer control header (PCH) 280. The PCH comprises station status information ST1 210 and ST2 215, bit mapping for active and retransmission slaves 220, power control indication (PCI) 221, and a transient message indication flag (T) 222. The PCH information is coded with high redundancy level for high reliability by including a cyclical redundancy check CRC0 225 for the PHY control header of the broadcast polling packet 200. Each PCH include 65 information bits (before coding). The bitmap field 220 is used to indicate which slaves are requested to respond to the broadcast polling packet 200. If there are N slaves, then the bitmap field comprises at least N bits, each bit serving as a response request flag for its corresponding slave. For instance, the slave with ID5 can check the $5^{th}$ bit in the bitmap 220 to determine whether it needs to respond to the broadcast polling packet. In fields ST1 or ST2, some information can be embedded including master ID, type of the super-frame cycle (e.g., association cycle, refresh cycle, regular polling cycle etc.).

The broadcast packet 200 also contains a payload part 285 that comprises downlink slave data 230 and 240 with CRC 235 and 245, downlink transient data 250 with CRC 255, and resource allocation 260 with CRC 265. In particular, the fields in the payload of the broadcast packet 200 are specified as follows:

Slave-1 data 230: Data for slave-1 is carried in this field.

CRC 1 225: The cyclic redundancy check for the slave-1 data 230.

Slave-N data 240: Data for slave-N is carried in this field.

CRC N 245: The cyclic redundancy check for the slave-N data 240.

Transient data 250: The broadcast polling packet 200 carries a transient message for a particular slave. This field contains the transient message. The transient message 250 provides an opportunity for the master 110 to send to a particular slave bulk data, control and configuration commands and other data which are otherwise too big to accommodate in the slave data portion 230 of the polling packet 200.

CRC T 245: the cyclic redundancy check for the transient data 250.

Resource allocation (for slaves 1 through N) 260: This field is used to convey each slave what communication resources, e.g., frequency sub-carriers, for the slave's response packet 210 transmission.

CRC 265: The cyclic redundancy check for the resource allocation data 260.

Because there is a separate CRC for each slave data, a particular slave only needs to verify the CRC of its own data part after hearing the broadcast polling packet. As long as the CRC check for the header and the CRC check for its own data part are correct, the slave considers the broadcast polling packet successfully received.

The payload length for MAC packet may vary, depending on the number active and retransmission slaves, and whether a transient message is included in the packet. In a particular implementation, the PHY control header 280 settings are as in Table 1.

TABLE 1

| | |
|---|---|
| ST1 210 & ST2 215: | Status information, 1 Byte each, total 16 bits. |
| Bitmap 220: | Indication of active/retransmission slaves, N = 32 bits. For broadcast polling transmission, if the kth bit, k = 0, 1, ..., 31, is equal to 1, the $k^{th}$ slave needs to send the response data in the coming uplink transmissions; otherwise this slave is inactive. For GACK transmission, if the $k^{th}$ bit is equal to 1, the $k^{th}$ slave needs to retransmit data in the next uplink transmissions; otherwise the corresponding slaves do not retransmit. |
| T 222: | Indication of with/without Transient messages, 1 bit. T = 0 implies no transient messages, while T = 1 suggests that a transient message is included. |
| PCI 221: | Power control indication, 8 bits. |
| CRC0 225: | 8 bits CRC checking. The CRC divisor is given by the polynomial $x^8 + x^7 + x^3 + x^2 + 1$. |

Figure 4:
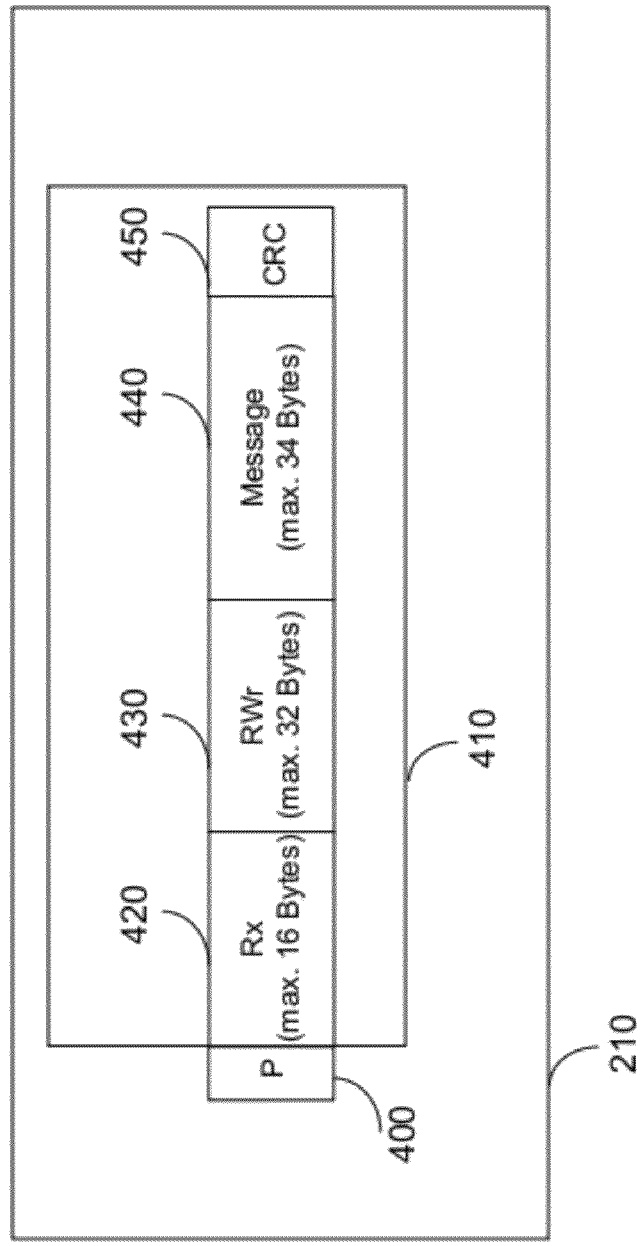
FIG. 4 is a block diagram of a slave response uplink transmission packet according to embodiments of the invention.

The master also sets a timer 205 to indicate an end of a slave response period. As shown in FIG. 4, after receiving the broadcast polling packet 200, each slave transmits a response packet 210 to the master. Each slave response packet 310 comprises the following fields as shown in FIG. 4.

Preamble P 400: Time domain pilot or training signal used for channel estimation. In a particular implementation of the current invention, one OFDM symbol is used for time-domain pilot with a fixed time interval equal to 11.9 μs.

Payload data 410: The payload of uplink response packet 210 for each slave includes Rx 420, RWr 430, message 440 and CRC 450. In a particular implementation according to the invention, the settings for these fields are given in Table 2.

TABLE 2

| | | |
|---|---|---|
| Rx 420: | Maximum 16 bytes. | Bit data that are transmitted from the master to a slave device to control and configure remote input and output of the slave device. |
| RWr 430: | Maximum 32 bytes. | Word data that are transmitted from the master to a slave device to write to and read from remote registers of the slave device |
| Message 440: | Maximum 34 bytes. | Transient message for |

TABLE 2-continued

| CRC 450: | 8 bits | the master from a slave device check sum |
|---|---|---|

After broadcasting the packet 200, the master 110 waits for the response period timer 205 to expire. Upon expiration of the timer 205, the master processes the successfully received slave responses 210. The master broadcasts the GACK 220.

The master also sets a second timer 215, which is the GACK period timer. Slave IDs are implicitly known to the master node because of orthogonal transmission resources (frequency sub-carrier etc). Therefore, slave IDs are no carried in the uplink packets 210, 230, 250.

Figure 5:
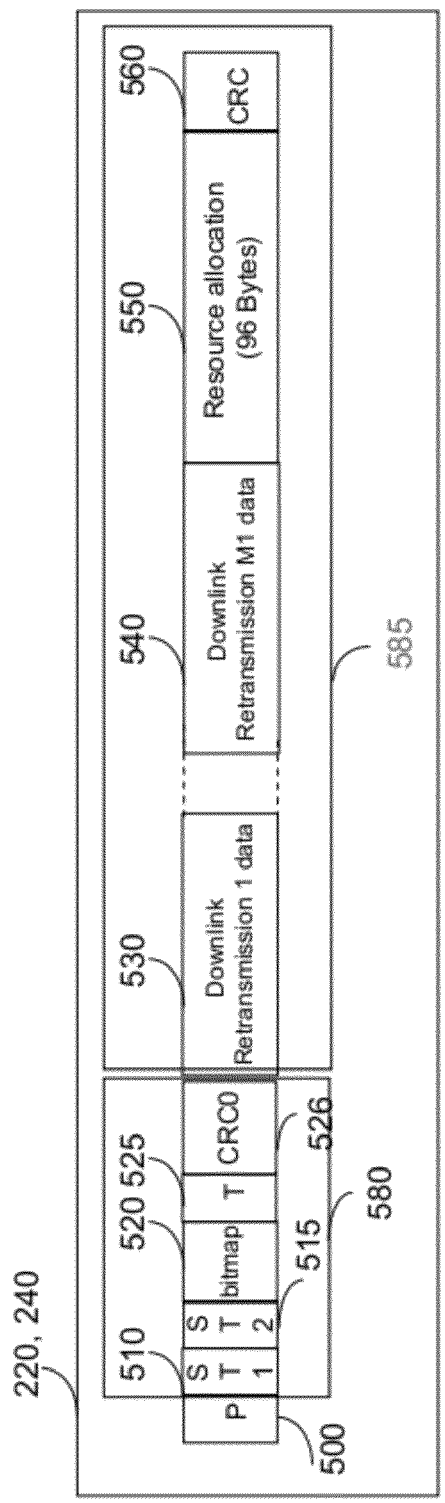
FIG. 5 is a block diagram of a group acknowledgement (GACK) 1 and GACK 2 packets according to embodiments of the invention.

The downlink GACK 220 {220.240} packets comprises the following fields as shown in FIG. 5.

Preamble P 500: Each preamble is composed of a certain number of OFDM symbols and occupies a fixed time interval. The preamble is used for signal detection, frequency-offset cancellation, time synchronization, and channel estimation. In one implementation of the invention, three OFMD symbols are used for the preamble, resulting in preamble length of 35.7 µs.

Physical layer control header (PCH) 580: The PCH includes station status information ST1 510 and ST2 515, bit mapping for active/retransmission slaves 520, a transient message indication flag (T) 525 that is used to inform the slaves of that the transient message is being retransmitted in this packet {220, 240}. The PCH information is coded with high redundancy level for high reliability. In other words, the PCH 580 ends with CRC0 526.

The PCH 580 includes a certain number of information bits (before coding). In a particular implementation, the length of the PCH is 65 bits. The bitmap field 520 is used to indicate which slaves need to retransmit their data. If there are N slaves, then the bitmap field comprises at least N bits, each bit serving as a retransmission request flag for its corresponding slave. For instance, the slave with ID5 can check the $5^{th}$ bit in the bitmap 520 to see whether it needs to retransmit its data to the master.

The CRC0 526 is the cyclic redundancy check for the PHY control header of the GACK 1 220 and GACK 2 240 packets. In fields ST1 or ST2, some information can be embedded including master ID, type of the super-frame cycle (e.g., association cycle, refresh cycle, regular polling cycle etc.).

In some implementations, it is possible to omit ST1 or ST2 or both. ST1 510 and ST2 515 can be used to carry the master ID to distinguish the GACK packet {220, 240} from the packets transmitted by any other master in another network or a stand-by master in the same network.

Downlink retransmission data {530-540}: In the broadcast polling packet 300, data are broadcast for the slaves 120. If the slaves, which the master expected a response in the response period 305, fail to transmit a response, the master 110 assumes that those slaves did not receive their data in the broadcast polling packet 300. Therefore, the data in the broadcast polling packet for those slaves are copied and retransmitted in the GACK packet 320 in this allocated field 820.

Resource allocation for retransmitting slaves 830: In this field, resource allocations are reported to the slaves for their retransmission. Slaves that successfully transmitted their responses release their communication resources (e.g., OFDM sub-carriers, frequency channels etc) for the use of failed slaves in their retransmission. The master 110 distributes the available resources among the failed slaves to increase their chances of successful retransmission in the $1^{st}$ GACK period 215 and $2^{nd}$ GACK period 225.

CRC 560: A cyclic redundancy check is added to the resource allocation field for reliability.

After receiving a downlink GACK packet 220, a slave first checks the bitmap field 520 and the value of the corresponding bit for itself. If the bit indicates that retransmission is needed from that particular slave, the slave transmits the 'Rtx-1 response' packet 230, which is a copy of its original response 210. During the GACK period 215, the master continues to update its bookkeeping of the successfully received slave responses.

After the GACK period timer expires, the master 110 requests a second retransmission from the slaves of which retransmissions failed by preparing and transmitting a second GACK 240, and then sets a GACK2 period expiration timer 225. The structure of the second GACK 240 is the same as that of the first GACK 220.

Upon receiving the second GACK 240, the slaves that have retransmitted within the GACK interval 215 check the bitmap 510 of the GACK2 packet 240 to determine whether their retransmission was successfully received by the master during the first GACK interval 215. If the bitmap 520 indicates that those slaves need to retransmit their data for the second time, then the slaves retransmit 250 their response packet 210.

At the end of the GACK2 period 225, the master 110 owns the following information. The identity of the slaves that successfully transmitted responses from within the current super-frame. Data transmitted by the successfully heard slaves.

Let $s_i$ denote slave i for $1 \leq i \leq N$, where N is the total number of slaves. Let $S_M$ denote the set of slaves the main master received responses successfully, and $S_N$ the set of all slaves in the network. In the GACK packet 220, the master indicates in the bitmap 520 that the slaves that belong to the set $S_R$ need to retransmit where $$S_R = \{s_i \in (S_N - S_M), \text{ for } 1 \leq i \leq N\}$$

At the end of the GACK-1 interval 215, some slaves may have failed to transmit their responses 210. Let $S_{R2}$ denote the set of those slaves that failed. Then, the master indicates in the bitmap of the $2^{nd}$ GACK the slaves that belong to the set $S_{R2}$. Then, the slaves $s_i \in S_{R2}$, for $1 \leq i \leq N$ retransmit 250 their original responses 210.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for communicating in a network including a master and a set of slaves, wherein the communicating uses orthogonal frequency-division multiplexing (OFDM) and time division multiple access (TDMA) symbols on sub-carriers, comprising:

broadcasting, from the master to the set of slaves using downlinks and all of the sub-carriers, a broadcast polling packet including data packets for each slave and sub-carrier assignments for the slaves;

transmitting simultaneously, from each slave to the master using uplinks and the assigned sub-carriers, a response packet after receiving the broadcast polling packet; and broadcasting, from the master to the set of slave using the downlinks and all of the sub-carriers, a group acknowledgement packet, wherein the broadcast polling packet, the response packet, and the group acknowledgement packet comprise one superframe in one communication cycle, and wherein the broadcasting on the downlinks and the transmitting on the uplinks are disjoint in time.

2. The method of claim 1, wherein each slave has a unique identity (ID).

3. The method of claim 1, wherein each slave includes a sensor and operates in an industrial application.

4. The method of claim 1, wherein the broadcast polling packet further comprises a preamble composed of three of the OFDM and TDMA symbols, a physical layer control header and a payload.

5. The method of claim 4, wherein the physical layer control header further comprises master and slave status information, a bitmap field for indicating which slaves are requested to respond to the broadcast polling packet, and the power control indicator field, transient message indicator field and a cyclic redundancy check.

6. The method of claim 5, wherein the transient message indicator field comprises a transient message indicator field and the ID of the slave for which the transient message is responded.

7. The method of claim 4, wherein the payload of the broadcast polling packet comprises slave data for each active slave, cyclic redundancy check for each slave data, transient message, cyclic redundancy check for the transient message, resource allocation for slaves and cyclic redundancy check for the resource allocation bits.

8. The method of claim 1, wherein the master sets a timer to indicate an end of a slave response period.

9. The method of claim 1, wherein each response packet includes a pilot signal, and payload data.

10. The method of claim 1, wherein the superframe further comprises first retransmission data for slaves failing to respond to the broadcast polling packet, and first retransmission response packets corresponding to the retransmission data, and the group acknowledgement packet for the first retransmission packet.

11. The method of claim 8, wherein the superframe further comprises second retransmission data for slaves failing to respond to the first retransmission data, and second retransmission response packets corresponding to the first retransmission data.

12. The method of claim 1, wherein the group acknowledgement packet further comprises a physical layer control header, downlink retransmission data for the set of slaves, resource allocation information and a cyclic redundancy check.

13. The method of claim 12, wherein the physical layer control header comprises master and slave status information (ST1, ST2), a bitmap that indicates indices of the slaves from which uplink retransmissions are required, transient message retransmission field, and a cyclic redundancy check.

* * * * *